April 18, 1933.  C. DANTSIZEN  1,904,418
METHOD OF INSULATION
Filed Oct. 11, 1929

Inventor:
Christian Dantsizen,
by Charles E. Tullar
His Attorney.

Patented Apr. 18, 1933

1,904,418

UNITED STATES PATENT OFFICE

CHRISTIAN DANTSIZEN, OF SCHENECTADY, NEW YORK, ASSIGNOR TO GENERAL ELECTRIC COMPANY, A CORPORATION OF NEW YORK

METHOD OF INSULATION

Application filed October 11, 1929. Serial No. 399,063.

The present invention relates broadly to a new and improved method of insulation.

One object of this invention is to provide a method whereby materials requiring electrical insulation may be effectively insulated.

Another object of this invention is to provide a method whereby materials requiring electrical insulation may be preshaped or preformed into any desired final configuration and then insulated.

A further object of this invention is to provide a method whereby an inorganic electrical insulator may be applied easily and effectively and in such a manner as to obviate the use of ordinary organic insulation material.

One of the chief objections to wires or conductors of any shape which have been insulated by a film or insulating coating is that such a film on bending of the conductor flakes off giving rise to short circuits between turns. This, as will be obvious, is highly objectionable and in the past has been the difficulty in applying, for example, inorganic insulating coatings to conductors where it was desired to eliminate ordinary organic insulation material and to produce a more compact unit. I have discovered a method whereby I can overcome this difficulty.

I have found that if, for example, two wires are placed in intimate contact with each other, as by winding them in parallel in a solenoid, or winding them together into a coil in which the bare conductors are in intimate contact, and then making them the anode in a solution of the fluoride of an alkali metal, I can build up an electrical insulating coating all around the individual wires and even to the extent that the insulating coating penetrates the region where the wires were originally in metallic contact. This provides an easy, simple, and efficient way of making an electric insulator on preshaped or preformed articles. For example, to cite one instance of this application, bare copper wires either as such, or zinc coated, may be wound on a stator, the winding being suitably insulated from the core. I may insulate the winding from the core in any suitable way, for example, by interposing paper between the winding and the core, or by providing an insulating coating, such as an enamel, on the surface of the core. The stator may then be placed in a saturated solution of potassium fluoride and an insulating film may be formed on the conductors constituting the winding by making the latter the anode and passing an electric current through the electrolyte, using a part of the stator itself or any other suitable conductor as the cathode.

Another example will illustrate my invention:

Two 3 inch lengths of ⅛ in. zinc wire were brought into intimate metallic contact by twisting, and placing them as anode in a saturated solution of potassium fluoride, a current density of 0.1 ampere per square inch being used, current was supplied for about five minutes. An insulating coating was formed on both wires which after removal from the solution were washed, dried and tested. It was found that the two wires formerly in electrical contact now were insulated from each other.

Not only is it possible to make electrically insulating coatings on conductors preformed into any desired final configuration using zinc or zinc coated conductors as anode in a solution of the fluoride of an alkali metal, but also my invention is applicable to other metals and other solutions. For example, aluminum or aluminum coated conductors which have been preshaped into any desired final configuration may be made the anode in a solution of potassium fluoride and an insulating coating obtained, or the same type of conductor may be made the anode in a dilute solution of an alkali silicate or borate, such as sodium silicate or sodium borate, and an insulating coating obtained in accordance with the process outlined above.

It will be seen that by the process of my invention it is a simple matter to obtain an effective insulating coating on a conductor which has been preformed into any desired final configuration.

Also a conductor before being formed into the desired final configuration may be coated in accordance with the process of my invention. The conductor may then be put into the desired final form as, for example, wound on a stator as described above, then the shaped conductor may be made the anode in the proper bath so as to "heel" up any places where the insulation has been removed in the forming of the conductor.

My process is obviously applicable to insulating any metallic conductor which has been coated with a metallic insulating coating after which the conductor may be shaped and placed in the proper bath and insulated as above.

It is not at all obvious that two conductors originally in metallic contact can be insulated electrically from each other by being made the anode in a proper electrolyte. On the contrary, it would be regarded as highly probable that such conductors would remain in metallic electrical contact even though made the anode in a suitable electrolyte. The insulating action which takes place I believe is best explained as follows, although I wish it understood that I do not limit myself to the precise theory developed, nor is it to be taken as limiting in any way the scope of my invention.

Referring to the drawing accompanying and forming part of this application:

Fig. 1 illustrates conditions at the beginning of the process;

Fig. 2 illustrates conditions when insulation is around both wires except at the point of contact; and Fig. 3 indicates the complete insulation.

Figure 1:
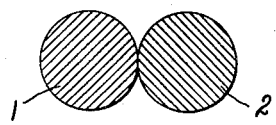
Figs. 1, 2 and 3 are cross-sectional views of two conductors and indicate three successive steps in the formation of an insulating coating between two conductors originally in metallic contact.
Figure 2:
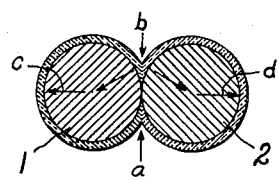

The theory which I have developed may be explained by considering as an example two aluminum wires, 1 and 2, used while in metallic contact as shown in Fig. 1 of the drawing, as anode in a suitable electrolyte. This theory as applied to aluminum wires depends on the following assumptions; first, that close to the surface of the aluminum there is produced by anodic oxidation a film of aluminum oxide of high dielectric strength; second, that on top of this film there is produced an aluminum oxide which is a good space insulator but is pervious to aqueous solutions; third, that this outer layer of aluminum oxide occupies a greater volume than the metal from which it is formed, and fourth, that if during the anodic process the film close to the aluminum is broken the current will instantly build up at that point thereby healing the broken section.

Figure 3:
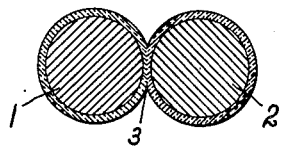

As the oxide is built up anodically and occupies more space than the metal from which it is formed, what probably happens is that at points $a$ and $b$ stresses will be set up reacting in the directions $c$ and $d$ thereby tending to push the wires apart. A minute separation of the wires will then break the high dielectric film at the point of contact, with the result that the current will penetrate to that point, thereby forming a space insulating film of alumina at that point. This form of oxide being bulky in nature pushes the wires apart and the insulation builds up between them completely insulating the two wires with a film of insulation as shown at 3 in Fig. 3.

An analogous theory is applicable to other metals employed in suitable electrolytes as anodes in accordance with the process of my invention.

What I claim as new and desire to secure by Letters Patent of the United States is:

1. The process of insulating a metallic conductor shaped into any desired final form in which the abutting parts of the shaped conductor are in electrical contact, which consists in making the shaped conductor the anode in an electrolyte which on electrolysis deposits an insulating coating throughout the entire surface of the shaped conductor, including the parts thereof originally in electrical contact, and passing an electric current through the electrolyte for a time sufficient to effect such insulation of the entire shaped conductor.

2. The process of insulating a conductor, which consists in making said conductor the anode in an electrolyte which deposits thereon a film of insulating material, shaping said coated conductor into any desired final form in which the abutting parts of the shaped conductor are in close contact, making the shaped conductor again the anode in a similar electrolyte and passing an electric current through the electrolyte whereby any of the formed parts of the conductor which may have lost their insulating coating during shaping are reinsulated.

3. The process of insulating a body which has been preformed into any desired final configuration in which the individual conductors are in intimate electrical contact and which consists of a plurality of copper conductors having a zinc surface, which comprises making the shaped body the anode in a saturated solution of potassium fluoride and electrolyzing said solution using a current density of about 0.1 ampere per square inch for a time sufficient to insulate all parts of said body from each other including the parts of the conductors originally in electrical contact.

4. In the process of making an electrical apparatus having a metallic winding and a metallic core, the steps which include insulating the winding as follows: covering the metallic winding with a layer of zinc, suitably insulating the winding from the metallic core, making the winding the anode in a potassium fluoride solution and the metallic core the cathode and passing an electric current through said solution.

5. In the process of making an electrical apparatus having a copper winding and an iron core, the steps which include insulating the winding as follows: covering the copper winding with a layer of zinc, providing the iron core with an enamel coating so as to suitably insulate the winding from the iron core, making the winding the anode in a saturated potassium fluoride solution and the iron core the cathode and passing an electric current through said solution.

6. The process of producing insulation between contiguous points of a plurality of conductors in intimate mechanical relation and electrical contact and constituting a body shaped into final configuration, which includes the steps of making said body the anode in an electrolyte, which, on electrolysis, deposits thereon a film of electrical insulating material, and electrolyzing the electrolyte for a time sufficient to produce such film on the entire surface of said body including the contiguous points of the conductors originally in electrical contact.

7. The process of forming an insulating winding on a dynamo electric machine, which comprises forming the coil of bare conductors wound in place in intimate electrical contact with each other and suitably insulated from the core and producing electrical insulation between turns by making the coil the anode in an electrolyte which deposits a film of insulating material throughout the entire surface of the bare conductors and passing an electric current through said electrolyte.

In witness whereof, I have hereunto set my hand this 8th day of October, 1929.

CHRISTIAN DANTSIZEN.